(12) United States Patent
Yang et al.

(10) Patent No.: US 9,936,382 B2
(45) Date of Patent: Apr. 3, 2018

(54) METHOD AND SYSTEM FOR PAIRING A SENSOR DEVICE TO A USER

(75) Inventors: Yun Yang, Los Altos, CA (US); Saeed Azimi, Los Gatos, CA (US)

(73) Assignee: VITAL CONNECT, INC., San Jose, CA (US)

( * ) Notice: Subject to any disclaimer, the term of this patent is extended or adjusted under 35 U.S.C. 154(b) by 518 days.

(21) Appl. No.: 13/301,546

(22) Filed: Nov. 21, 2011

(65) Prior Publication Data

US 2013/0130622 A1     May 23, 2013

(51) Int. Cl.
| | |
|---|---|
| *H04B 7/00* | (2006.01) |
| *H04W 12/06* | (2009.01) |
| *H04W 4/20* | (2018.01) |
| *H04W 4/00* | (2018.01) |

(52) U.S. Cl.
CPC ............ *H04W 12/06* (2013.01); *H04W 4/206* (2013.01); *H04W 4/005* (2013.01)

(58) Field of Classification Search
CPC ............ H04B 7/00; G08B 1/08; H04W 12/06
USPC ...................................... 455/41.1, 41.2, 41.3
See application file for complete search history.

(56) References Cited

U.S. PATENT DOCUMENTS

| | | | |
|---|---|---|---|
| 7,848,703 B1 | 12/2010 | Beard et al. | |
| 8,116,685 B2 * | 2/2012 | Bregman-Amitai | H04W 12/04 348/222.1 |
| 8,353,447 B2 * | 1/2013 | Yach | G06Q 10/107 235/375 |
| 8,879,994 B2 * | 11/2014 | Brown | H04N 1/00347 455/41.2 |
| 2002/0190128 A1 * | 12/2002 | Levine | G06K 17/0022 235/462.13 |
| 2004/0253923 A1 * | 12/2004 | Braley | H04L 29/12009 455/41.2 |
| 2005/0136901 A1 * | 6/2005 | Jung | H04M 1/7253 455/415 |
| 2005/0139680 A1 * | 6/2005 | Anttila | G06K 1/18 235/462.46 |
| 2007/0123166 A1 * | 5/2007 | Sheynman | H04M 1/7253 455/41.2 |
| 2007/0141989 A1 * | 6/2007 | Flinchem | H04W 48/20 455/41.2 |
| 2007/0249286 A1 * | 10/2007 | Ma | G06F 19/327 455/41.3 |

(Continued)

OTHER PUBLICATIONS

PCT International Search Report and Witten Opinion of the International Searching Authority, dated Mar. 18, 2013, application No. PCT/US2012/065340.

*Primary Examiner* — Md Talukder
(74) *Attorney, Agent, or Firm* — Brundidge & Stanger, P.C.

(57) ABSTRACT

A method, system, and a computer-readable medium for pairing a wireless sensor device to a user are disclosed. The method, system, and computer-readable medium comprise providing an identification code that includes a network address within the wireless sensor device. The method, system, and computer-readable medium include utilizing an application within a mobile device. The application selects the user, obtains the identification code, scans for network addresses, and compares the network address to the scanned network addresses. When the network address matches one of the scanned network addresses, the wireless sensor device is paired to the user by the application.

19 Claims, 2 Drawing Sheets

(56) References Cited

U.S. PATENT DOCUMENTS

| | | | | |
|---|---|---|---|---|
| 2008/0280627 A1* | 11/2008 | Moran | H04M 1/2745 | 455/456.1 |
| 2009/0225172 A1* | 9/2009 | Tsuchiya | H04N 1/00127 | 348/207.1 |
| 2010/0099418 A1* | 4/2010 | Holley | H04L 45/308 | 455/445 |
| 2010/0185754 A1 | 7/2010 | Owen | | |
| 2010/0263006 A1* | 10/2010 | Matsuyama | H04N 21/4135 | 725/109 |
| 2010/0315225 A1* | 12/2010 | Teague | A61B 5/0024 | 340/539.12 |
| 2011/0072263 A1* | 3/2011 | Bishop | G06F 21/36 | 713/168 |
| 2011/0081860 A1* | 4/2011 | Brown | H04N 1/00347 | 455/41.3 |
| 2011/0221590 A1* | 9/2011 | Baker | A61B 5/0002 | 340/539.12 |
| 2012/0015605 A1* | 1/2012 | Sole | H04W 12/06 | 455/41.3 |
| 2012/0190299 A1* | 7/2012 | Takatsuka | H04B 5/00 | 455/41.1 |
| 2012/0324054 A1* | 12/2012 | Gibbon | H04L 65/1069 | 709/218 |
| 2012/0324076 A1* | 12/2012 | Zerr | H04W 4/206 | 709/223 |
| 2013/0005246 A1* | 1/2013 | Waters | H04L 69/24 | 455/41.1 |
| 2013/0130622 A1* | 5/2013 | Yang | H04W 12/06 | 455/41.2 |
| 2013/0190018 A1* | 7/2013 | Mathews | H04W 4/023 | 455/456.6 |
| 2014/0013100 A1* | 1/2014 | Menzel | H04N 21/43637 | 713/150 |
| 2014/0067426 A1* | 3/2014 | Neff | G06F 19/322 | 705/3 |
| 2014/0235205 A1* | 8/2014 | Paluch | H04W 12/06 | 455/411 |
| 2015/0002261 A1* | 1/2015 | Schiavi | G07C 1/10 | 340/5.8 |

\* cited by examiner

METHOD AND SYSTEM FOR PAIRING A SENSOR DEVICE TO A USER

FIELD OF THE INVENTION

The present invention relates to wireless sensor devices, and more particularly, to a method and system for wireless sensor device pairing.

BACKGROUND

Wireless sensor devices are used in a variety of applications including the health monitoring of individuals. Tracking the usage of these wireless sensor devices is essential to enabling the proper recordation of pertinent health related data and information. These wireless sensor devices can be manually registered to users on an individual basis. However, to register these wireless sensor devices, the unique network address of each wireless sensor device must be readily known and manually registered to each individual. As a result, the registration process of the wireless sensor device can be inefficient, time consuming and costly.

These issues limit the tracking and registration of wireless sensor devices. Therefore, there is a strong need for a cost-effective solution that overcomes the above issues by creating a method and system for pairing a wireless sensor device to a user without having to know the unique network address of the wireless sensor device. The present invention addresses such a need.

SUMMARY OF THE INVENTION

A method, system and computer-readable medium for pairing a wireless sensor device to a user are disclosed. In a first aspect, the method comprises providing an identification code that includes a network address within the wireless sensor device. The method includes utilizing an application within a mobile device. The application selects the user, obtains the identification code, scans for network addresses, and compares the network address to the scanned network addresses. When the network address matches one of the scanned network addresses, the wireless sensor device is paired to the user by the application.

In a second aspect, the system comprises a processing system and an application that is executed by the processing system. The application selects a user, obtains an identification code including a network address from a wireless sensor device, scans for network addresses, and compares the network address to the scanned network addresses. When the network address matches ones of the scanned network addresses, the wireless sensor device is paired to the user by the application.

In a third aspect, the computer-readable medium comprises providing an identification code that includes a network address within the wireless sensor device. The computer-readable medium includes utilizing an application within a mobile device. The application selects the user, obtains the identification code, scans for network addresses, and compares the network address to the scanned network addresses. When the network address matches one of the scanned network addresses, the wireless sensor device is paired to the user by the application.

BRIEF DESCRIPTION OF THE DRAWINGS

The accompanying figures illustrate several embodiments of the invention and, together with the description, serve to explain the principles of the invention. One of ordinary skill in the art will recognize that the particular embodiments illustrated in the figures are merely exemplary, and are not intended to limit the scope of the present invention.

DETAILED DESCRIPTION OF PREFERRED EMBODIMENTS

The present invention relates to wireless sensor devices, and more particularly, to a method and system for wireless sensor device pairing. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

A method and system in accordance with the present invention allows for a wireless sensor device to be seamlessly paired with a user. By implementing an application within a mobile device, an efficient and cost-effective wireless sensor device pairing system is achieved that can support a significant number of users and devices. One of ordinary skill in the art readily recognizes that a variety of wireless sensor devices may be utilized and that would be within the spirit and scope of the present invention.

To describe the features of the present invention in more detail, refer now to the following description in conjunction with the accompanying Figures.

Figure 1:
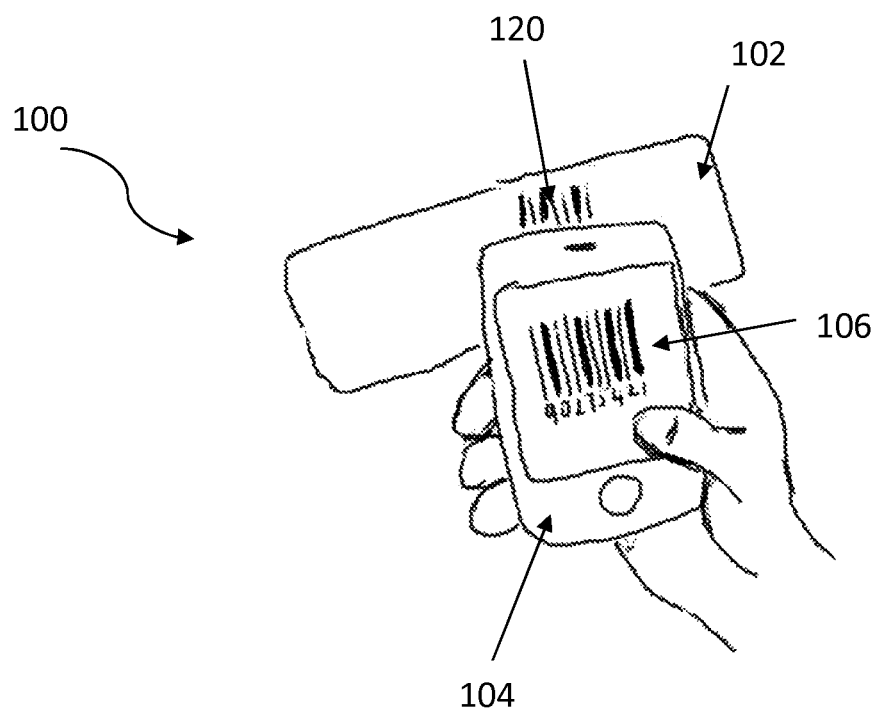
FIG. 1 illustrates a system in accordance with an embodiment.

FIG. 1 illustrates a system 100 in accordance with an embodiment. The system 100 includes a wireless sensor device 102, a mobile device 104, and an application 106 coupled to the mobile device 104. The wireless sensor device 102 includes an identification code 120 with a network address. In one embodiment, the network address is a unique 48-bit network address.

One of ordinary skill in the art readily recognizes that the identification code 120 can be represented as a variety of codes including but not limited to a QR code or a bar code and that would be within the spirit and scope of the present invention. One of ordinary skill in the art readily recognizes that the wireless sensor device 102 and the mobile device 104 can include a variety of devices including but not limited to health monitoring sensors, cell phones, and cameras and that would be within the spirit and scope of the present invention.

Figure 2:
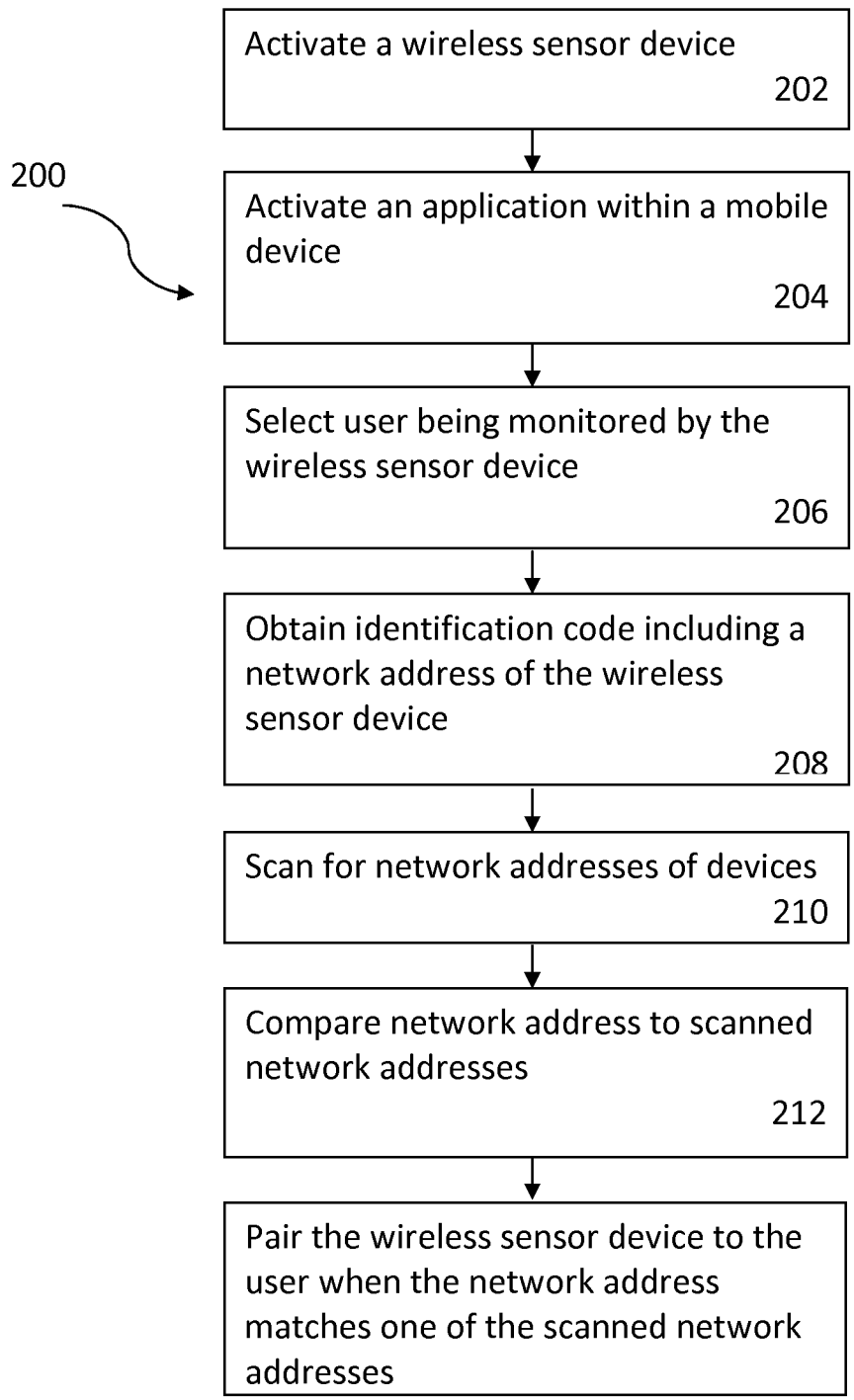
FIG. 2 illustrates a flow chart of a method in accordance with an embodiment.

FIG. 2 illustrates a flow chart 200 of a method in accordance with an embodiment. A wireless sensor device is activated prior to being placed on a user that is being monitored by the wireless sensor device, via step 202. In step 204, an application located within a mobile device is activated by an operator of the mobile device. One of ordinary skill in the art readily recognizes that the application located within the mobile device may be activated prior to activating the wireless sensor device and that activation would be within the spirit and scope of the present invention. In step 206, the operator selects the user that is being monitored. In one embodiment, this selection is done by either selecting a user name from a predetermined user list or by entering a new user name into the application. One of ordinary skill in the art readily recognizes that additional information may be selected or entered by the operator of the application to identify the user that is being monitored and that would be within the spirit and scope of the present invention.

In step 208, the operator uses the application to obtain an identification code including a network address located on the wireless sensor device. In one embodiment, the network address is a unique 48-bit network address. One of ordinary skill in the art readily recognizes that the identification code may be obtained in a variety of ways including but not limited to turning on a camera within the mobile device, taking a picture of the identification code, and storing the picture on the mobile device and that would be within the spirit and scope of the present invention.

In addition, one of ordinary skill in the art readily recognizes that after the picture of the identification code is taken, the identification code may be processed and recognized using a variety of mechanisms including but not limited to an image processing algorithm implemented within the mobile device and the use of such mechanisms would be within the spirit and scope of the present invention.

In step 210, the operator uses the application to scan for network addresses of devices. In one embodiment, unconnected Bluetooth wireless sensor devices in proximity to the mobile device are scanned and the network addresses of these unconnected Bluetooth wireless sensor devices are obtained by the application. One of ordinary skill in the art readily recognizes that a variety of methodologies may be utilized to determine the proximity of the unconnected devices to the mobile device including but not limited to location based GPS systems and that would be within the spirit and scope of the present invention.

After the application retrieves the network addresses of the devices, the application then automatically compares the network address to the scanned network addresses of the devices in step 212. In step 214, when the network address matches one of the scanned network addresses, the wireless sensor device is paired to the user by the application which completes the registration process.

As above described, the method and system allow for an automated pairing of a wireless sensor device to a user to improve the efficiency of wireless sensor device tracking and registration. By implementing an application within a mobile device, an efficient and cost-effective wireless sensor device pairing system is achieved that can support a significant number of users and devices.

A method and system for pairing a wireless sensor device to a user has been disclosed. Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk—read/write (CD-R/W).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for pairing a wireless sensor device to a user being monitored by the wireless sensor device, the method comprising:
    obtaining, by a computing device, an identification code from a wireless sensor device, wherein the identification code includes a network address that is uniquely assigned;
    utilizing, by the computing device, an application to select a user name associated with the user from a predetermined user list;
    wirelessly scanning, by the computing device via Bluetooth, for network addresses of unconnected wireless sensor devices that are each within a predetermined proximity to the computing device based on a GPS location,
    retrieving, by the computing device, the network addresses of the unconnected wireless sensor devices;
    comparing, by the computing device, the network address from the obtained identification code of the wireless sensor device to the scanned network addresses of the unconnected wireless sensor devices; and
    pairing, by the computing device, the wireless sensor device to the user by the application implemented by the computing device when the network address is matched to one of the scanned network addresses.

2. The method of claim 1, wherein the identification code is a bar code.

3. The method of claim 1, wherein the identification code is a Quick Response (QR) code.

4. The method of claim 1, wherein the application enables an individual to enter the user name into the application.

5. The method of claim 1, wherein the application obtains the identification code by utilizing a camera within the computing device to take a picture of the identification code.

6. The method of claim 1, wherein the unconnected wireless sensor devices are unconnected Bluetooth devices.

7. The method of claim 1, wherein when the wireless sensor device is paired to the user by the application, a registration process is completed.

8. The method of claim 1, wherein the network address is a unique 48-bit network address.

9. The method of claim 1, further comprising tracking users in the predetermined user list, wherein the tracking users includes:

creating the predetermined user list, and
identifying users who are paired.

10. The method of claim 1, further comprising, in response to the predetermined user list not including the user name associated with the user, entering, by the application, a new user name associated with the user in the predetermined user list.

11. A non-transitory computer-readable medium containing program instructions for pairing a wireless sensor device to a user being monitored by the wireless sensor device, wherein execution of the program instructions by one or more processors of a computer causes the one or more processors to carry out the steps of:

obtaining, by a computing device, an identification code from a wireless sensor device, wherein the identification code includes a network address that is uniquely assigned;

utilizing, by the computing device, an application to select a user name associated with the user from a predetermined user list;

wirelessly scanning, by the computing device, via Bluetooth for network addresses of unconnected wireless sensor devices that are each within a predetermined proximity to the computing device based on a GPS location, obtaining, by the computing device, the network addresses of the unconnected wireless sensor devices;

comparing by the computing device, the network address from the obtained identification code of the wireless sensor device to the scanned network addresses of the unconnected wireless sensor devices; and pairing, by the computing device, the wireless sensor device to the user by the application implemented by the computing device when the network address is matched to one of the scanned network addresses.

12. A system that pairs a wireless sensor device to a user being monitored by the wireless sensor device, comprising:
a wireless sensor device removably coupled to a user; and
a computing device including a processor and computer readable medium storing executable instructions that, in response to execution, cause the computing device to perform operations comprising:

obtaining an identification code from the wireless sensor device, wherein the identification code includes a network address that is uniquely assigned;

utilizing an application to select a user name associated with the user from a predetermined user list;

wirelessly scanning via Bluetooth for network addresses of unconnected wireless sensor devices that are each within a predetermined proximity to the computing device based on a GPS location, obtaining the network addresses of the unconnected wireless sensor devices;

comparing the network address from the obtained identification code of the wireless sensor device to the scanned network addresses of the unconnected wireless sensor devices; and pairing the wireless sensor device to the user by the application implemented by the computing device when the network address is matched to one of the scanned network addresses.

13. The system of claim 12, wherein the identification code is a bar code or a Quick Response (QR) code.

14. The system of claim 12, wherein the application enables an individual to enter the user name into the application.

15. The system of claim 12, wherein the application obtains the identification code by utilizing a camera within the computing device to take a picture of the identification code.

16. The system of claim 12, wherein the application scans for network addresses by scanning unconnected wireless sensor devices in proximity to the computing device and obtaining network addresses of the unconnected wireless sensor devices.

17. The system of claim 16, wherein the unconnected wireless devices are unconnected Bluetooth devices.

18. The system of claim 12, wherein when the wireless sensor device is paired to the user by the application, a registration process is completed.

19. The system of claim 12, wherein the network address is a unique 48-bit network address.

* * * * *